Jan. 25, 1944.  E. A. KEELER  2,339,861
MEASURING AND CONTROL APPARATUS
Filed Jan. 17, 1939  2 Sheets—Sheet 1
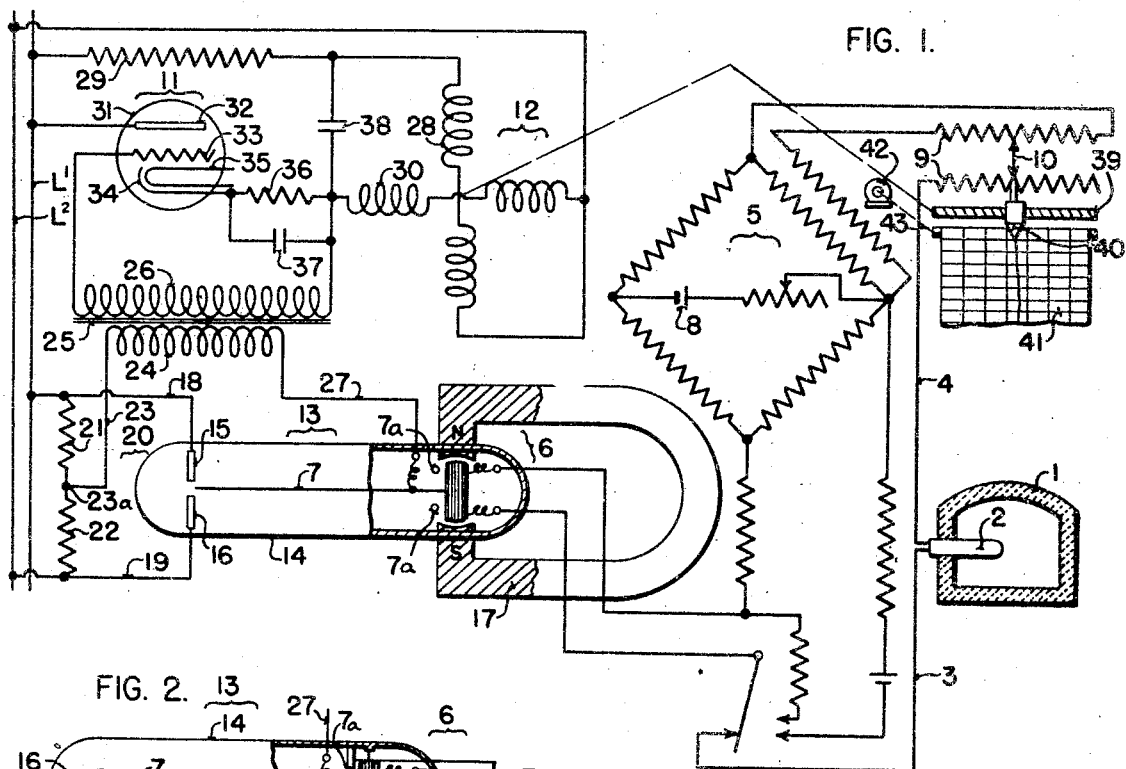
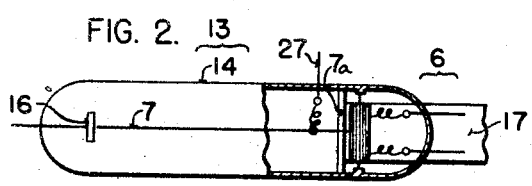
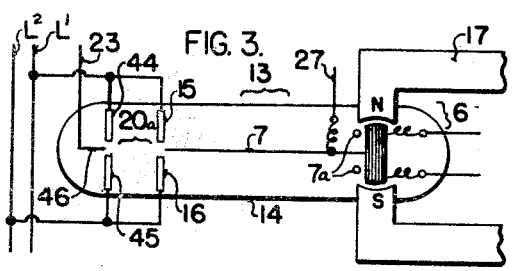
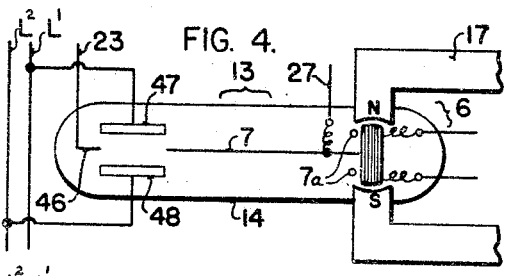
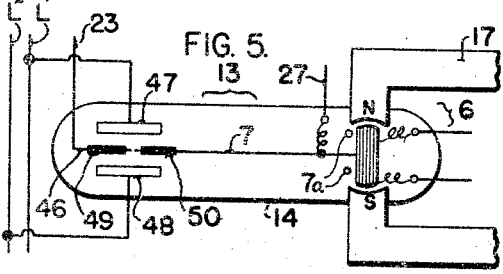
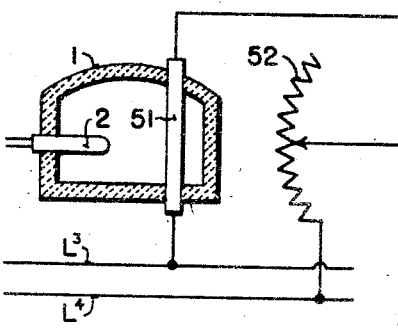
INVENTOR.
EARL A. KEELER
BY *George M. Umschang*
ATTORNEY Jan. 25, 1944.　　　　E. A. KEELER　　　　2,339,861
MEASURING AND CONTROL APPARATUS
Filed Jan. 17, 1939　　　　2 Sheets—Sheet 2

INVENTOR
EARL A. KEELER
BY
ATTORNEY

Patented Jan. 25, 1944

2,339,861

UNITED STATES PATENT OFFICE 2,339,861

MEASURING AND CONTROL APPARATUS

Earl A. Keeler, Norristown, Pa., assignor to The Brown Instrument Company, Philadelphia, Pa., a corporation of Pennsylvania Application January 17, 1939, Serial No. 251,302

17 Claims. (Cl. 171—95)

The present invention relates to instrumentalities useful in measuring and/or controlling a variable condition, and more particularly to electronic measuring and/or controlling apparatus adapted to produce effects in accordance with the deflection of an element which controls the apparatus and deflects in accordance with variations in a control quantity or in a quantity to be measured, and in which because of the small magnitude of the element deflecting force it is not desirable, nor practicable to have the said effects produced directly by the deflecting element.

It is a general object of the invention to provide a measuring instrument in which an element to be adjusted such as a recording pen, indicating pointer, or other exhibiting part of the instrument, is continuously regulated by a reversible electrical motor under control of a sensitive element deflecting in accordance with changes in the value of a quantity to be measured.

A specific object of the invention is to provide an instrument adapted to produce recording and/or controlling effects in accordance with the deflections of a sensitive measuring instrument deflecting in accordance with changes in the value of a quantity under measurement, wherein the means for producing such effects are controlled by a normally balanced control circuit including an electronic discharge valve, of which a pointer carried by the sensitive measuring instrument comprises one element.

In accordance with a preferred embodiment of my present invention, a control circuit and suitable means controlled thereby are provided for continuously regulating the adjustment of a recording pen, control valve, rheostat or the like, in response to unbalance of a self balancing potentiometric network as indicated by a sensitive galvanometer. The control circuit referred to comprises a normally balanced Wheatstone bridge network having fixed resistances in two opposed arms and the space path resistance between a pair of stationary electrodes contained in an electronic discharge valve in its remaining opposed arms. The Wheatstone bridge network is desirably energized from a source of alternating current and has its energizing terminals connected thereto and its equalizing or balancing terminals are connected to the input circuit of suitable electronic amplifying means.

One balancing junction of the bridge network is the point of engagement of the fixed resistors, and the other balancing junction is the point of engagement of the galvanometer needle or pointer with the discharge current passing between the stationary electrodes. The moving element of the galvanometer is contained inside the electronic valve, being mounted in any suitable manner therein, and is in inductive relation with a permanent magnet which is exterior of the valve. As will be readily apparent, the Wheatstone bridge network described will be balanced when the galvanometer pointer is in a position intermediate the electrodes, a condition which obtains when the potentiometric network is balanced, but when the latter is unbalanced, the pointer deflects in one direction or the other from that position to unbalance the bridge network in a corresponding direction and thereby cause an alternating potential in phase with the supply voltage or 180° out of phase therewith to appear between the balancing terminals of the bridge.

This unbalanced potential is amplified in any suitable manner and the amplified quantity is employed in a manner to be described to control the rotation and direction of rotation of a reversible electrical motor which may be employed to effect rebalance of the potentiometric network and thereby restoration of the galvanometer pointer to the position along the space discharge path between the stationary electrodes referred to in which the unbalance of the Wheatstone bridge network is zero.

In an alternative embodiment of the invention, an additional pair of stationary electrodes and a third electrode associated therewith may be included in the electronic discharge valve and employed in lieu of the fixed resistors referred to. In a further embodiment, only one pair of electrodes need be employed, a fixed electrode and the galvanometer pointer being positioned between them in a manner to be described.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings:

Fig. 1 is a diagrammatic view illustrating one embodiment of the invention as adapted for use in measuring and recording the temperature in a furnace;

Fig. 2 illustrates in detail the construction of the electronic valve and galvanometer arrangement employed in Fig. 1;

Figs. 3-5 illustrate modification of the arrangement of Fig. 2; and

Fig. 6 illustrates the use of the apparatus in a control system.

Figure 1A:
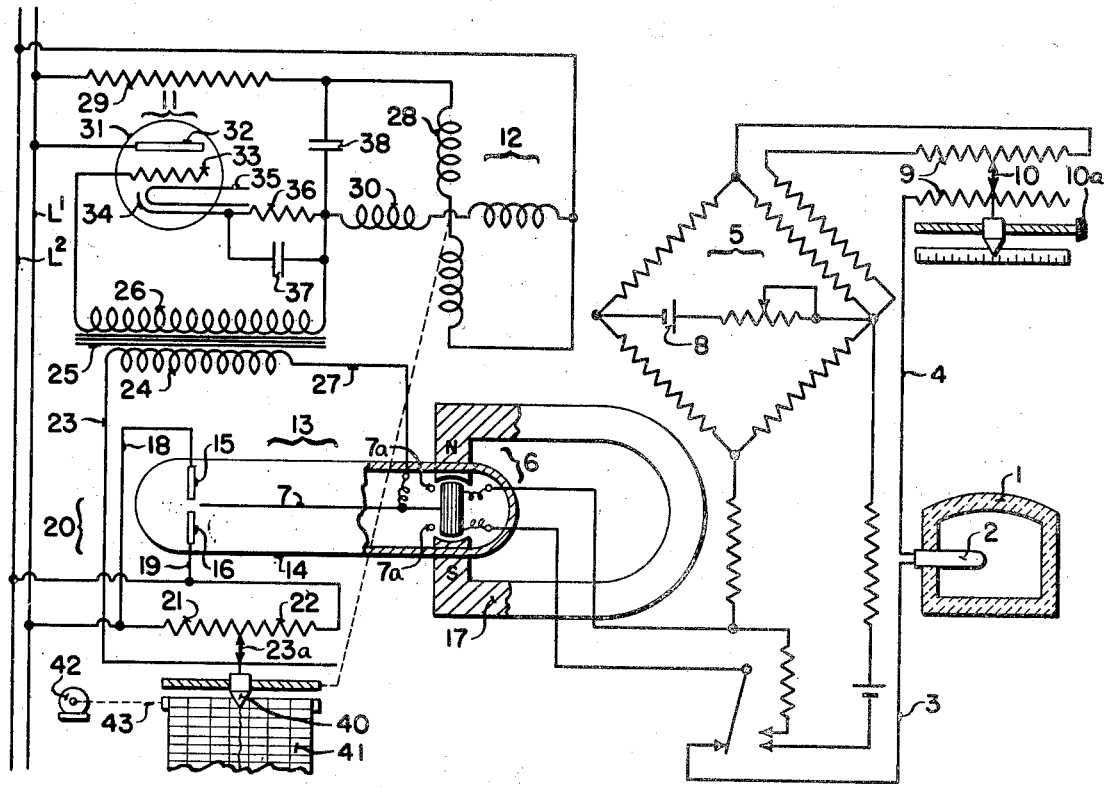
Fig. 1A illustrates a modification of the arrangement of Fig. 1.

In Fig. 1 of the drawings I have illustrated, more or less diagrammatically, a pyrometer for measuring and recording the temperature of the interior of a furnace 1. As illustrated, a thermocouple 2 is arranged in the interior of the furnace and the terminals of the thermocouple are connected by conductors 3 and 4 to the terminals of a null point potentiometric network 5 which may be of any suitable type such as the Brown potentiometric circuit disclosed in the Harrison et al. Patent 2,150,502, issued March 14, 1939, on application Serial No. 546,290, filed June 23, 1931. The moving coil of a galvanometer 6, which is equipped with a pointer 7 is connected in the conductor 3, and fixed stops 7a are desirably provided for limiting the deflection of the pointer 7.

The potentiometric circuit 5 is of a well-known type, and it is sufficient for the present purposes to note that the potentiometric circuit includes a circuit branch including the thermocouple 2, an opposing circuit branch including a source of known potential such as a battery 8, and resistors 9, a variable portion of which may be connected into the opposed branches by means of a sliding contact 10 whereby the respective effects of the variable and known sources are made equal and opposite and the galvanometer moving coil is thus rendered undeflected when the circuit is balanced for a given value of the E. M. F. of the thermocouple 2 with the contact 10 is a corresponding position along resistors 9. The position of the contact 10 is then a measure of the value of the thermocouple E. M. F. and, as will be clear, may serve as a measure of the temperature to which the thermocouple is exposed. The unreferenced switch and resistances associated with the galvanometer 6 are provided in order to permit standardizing adjustments of the potentiometric network 5 to be made. Such adjustments of the potentiometric network 5 are desirably made from time to time because the potential produced by the battery 8 does not ordinarily remain constant during the life thereof and as a consequence the source of known potential which is opposed to the thermocouple potential does not remain constant.

In the embodiment illustrated in Fig. 1, my invention is specifically concerned with the means by which the contact 10 is adjusted back and forth along resistors 9 in response to galvanometer deflection, and, as shown, includes an electronic amplifier 11 and a reversible electrical motor 12, the rotation and direction of rotation of which is adapted to be selectively controlled by amplifier 11. Motor 12 is connected in any convenient manner to contact 10 for adjusting the latter along resistors 9, and thereby effects rebalance of the potentiometric network 5 in response to a change in the E. M. F. of the thermocouple 2.

The manner in which deflection of galvanometer 6 from its neutral position operates to control the rotation and direction of rotation of motor 12 and thereby adjustment of the contact 10 along resistors 9 in response to potentiometer unbalance is best described by considering Fig. 2 in connection with Fig. 1. As illustrated, the moving coil of galvanometer 6 is contained in an electronic discharge valve 13 comprising an envelope 14 of suitable material, preferably of glass and exhausted to a high degree of vacuum or filled with a gas or vapor of a composition generally employed in the art; and a pair of spaced anodes 15 and 16 which are rigidly secured in the envelope in any convenient manner and disposed in cooperative relation with the end of galvanometer pointer 7. The moving coil of galvanometer 6 is mounted in any convenient manner in the envelope 14 and, as shown, is positioned at one end of the envelope between the poles of a permanent magnet 17 which is exterior of the envelope.

The anodes 15 and 16 are connected by conductors 18 and 19 to alternating voltage supply conductors $L^1$ and $L^2$ and, as will be noted, the space path resistance therebetween comprises two adjacent arms of a Wheatstone bridge network 20, the remaining arms of which are made up of fixed resistances 21 and 22 connected in series across the supply conductors. One equalizing or balancing terminal of the bridge network is the point of engagement 23a of resistors 21 and 22 which is shown connected by a conductor 23 to one terminal of the primary winding 24 of a transformer 25 having a secondary winding 26. The other balancing terminal of the bridge network is the point of engagement of the end of galvanometer pointer 7 with the discharge current passing between anodes 15 and 16, and, as illustrated, pointer 7 is connected by a conductor 27 to the other terminal of the transformer primary winding 24.

When the potentiometric network 5 is balanced the galvanometer pointer 7 will be intermediate the anodes 15 and 16, and the Wheatstone bridge network 20 will be in a balanced condition. On the occurrence of a change in the temperature of furnace 1, however, and consequently, on unbalance of the potentiometric network 5, the galvanometer pointer 7 will deflect in one direction or the other, and as a result an unbalanced voltage will appear between the bridge balancing terminals. This unbalanced voltage is impressed on the input circuit of amplifier 11 wherein it is amplified and the amplified quantity is applied to the motor 12 for selectively controlling the rotation thereof.

Motor 12 is a two-phase motor having one winding 28 connected across the supply conductors $L^1$ and $L^2$ in series circuit relation with a resistor 29 of suitable value, and another winding 30 connected across the supply conductors in series circuit relation with an electronic valve 31, the conductivity of which is adapted to be controlled by the bridge network 20. The windings 28 and 30 are spaced in quadrature with each other and are so disposed relatively to a squirrel cage rotor (not shown) that half of each winding is at diametrically opposite sides of the rotor. In the normal operation of such motors, the magnetic fields set up in the squirrel cage rotor by the windings 28 and 30 have a phase displacement of not more than 90° whereby the fields form together a rotating field to cause rotation of the rotor in one direction or the other accordingly as the field set up by the winding 28 is displaced in the forward or the backward direction relatively to the field set up by the winding 30.

The valve 31, which is connected in series circuit relation with the motor winding 30, is a heater type triode and includes an anode 32, a control grid 33, a cathode 34, and a heater filament 35. The control grid 33 is connected to the cathode 34 through a circuit which may be traced from the control grid 33 through the transformer secondary winding 26, and through a biasing resistor 36 to the cathode 34. The biasing resistor 36 is desirably shunted by a condenser 37 of suitable value. The anode circuit of valve 31 is arranged to be energized from the alternating current supply conductors L¹ and L² so that this valve will alternately be conductive and non-conductive and the magnitude of the pulsating current conducted by the valve is adapted to be varied by the alternating voltage impressed on the input circuit thereof by the bridge network 20.

A condenser 38 of suitable value is connected between the point of connection of biasing resistor 36 and motor winding 30 and the point of connection of resistor 29 and motor winding 28, and as will be readily apparent, when the effective conductivity of valve 31 is identical with that of resistor 29, the potentials on both terminals of the condenser 38 will be the same and the motor will remain stationary. As the conductivity of valve 31 varies, the impedance of the circuit path including the motor winding 30 will vary with respect to that of the motor winding 28 with the result that a difference in potential will exist across the terminals of condenser 38. In effect the latter will then be connected in series circuit relation with one motor winding and this arrangement in parallel with the other motor winding so that the current flow through the first mentioned motor winding will lead the current flow through the other motor winding and thereby produce rotation of the motor in one direction or the other. This arrangement for selectively controlling a motor for reversible operation is disclosed and claimed in a copending application Serial No. 159,198, filed August 14, 1937, by Thomas R. Harrison.

Thus, when the bridge network 20 is unbalanced as a result of deflection of the galvanometer pointer 7 in one direction or the other, an alternating voltage is impressed on the input circuit of valve 31 which is effective to change the conductivity of the valve as required to cause rotation of motor 12 in the proper direction to restore the potentiometric network 5 to its balanced condition and thereby to reduce the deflection of galvanometer pointer 7.

As illustrated, the shaft of motor 12 is connected in any convenient manner to a shaft 39 which may desirably be a rod having a spiral groove thereon, and the potentiometer rebalancing contact 10 is mounted on a carriage carried by shaft 39 and is arranged to be moved in one direction or the other as shaft 39 rotates. Thus, when motor 12 is energized for rotation as a result of a change in voltage generated in thermocouple 2, the motor effects an adjusting movement of the contact 10 along the resistors 9 to rebalance the potentiometric network 5 and restore the galvanometer pointer 7 to its normal undeflected position and thereby rebalance the bridge network 20. The bridge network 20 will then be rebalanced and the motor 12 will come to rest with the contact 10 at a new position along the slidewire resistors 9, which position will then provide a measure of the temperature to which the thermocouple 2 is exposed.

Desirably, a pen 40 mounted on the carriage which carries the potentiometer rebalancing contact 10, is arranged to cooperate with a recorder chart 41 and to thereby provide a continuous record of the temperature of the interior of furnace 1. The recorder chart is arranged to be driven in any convenient manner, as, for example, by a unidirectional motor 42 through suitable gearing 43 so that a record of the temperature of the interior of furnace 1 will be had as a continuous line on the chart 41.

With reference to the electric discharge valve 18, it is noted that when the resistances 21 and 22 are fixed in value, the bridge network 20 can never be in a precise balanced condition because of the non-uniform voltage gradient between the anodes 15 and 16. For example, when the envelope 14 is filled with neon gas, a large part of the potential drop between the anodes 15 and 16 will be in the region closely adjacent first one anode and then the other electrode in alternate half cycles of the alternating voltage impressed between the anodes. Thus, the potential of a point intermediate the anodes 15 and 16 will not remain constant even though the resistances 21 and 22, which comprise the remaining bridge network arms, are made equal in value, but will suddenly rise above and fall below a predetermined value in alternate half cycles of the voltage impressed on the bridge network. As a result, even when the galvanometer pointer 7 is undeflected, alternating currents will flow through the bridge equalizing conductors 26 and 27.

It is noted, however, that by properly choosing resistors 21 and 22 the bridge network can be balanced during one-half of each cycle of the applied alternating voltage when the end of galvanometer pointer 7 is intermediate the anodes 15 and 16, and by providing an amplifier 11 which is responsive only to that half cycle, the undesirable effects of the non-uniform voltage between the anodes 15 and 16 are avoided. The amplifier 11 illustrated in Fig. 1 is such an amplifier in that anode voltage is supplied valve 31 from the same alternating voltage source that supplies energizing current to the bridge network 20, and hence valve 31 is conductive during only one half of each cycle and is only then capable of detecting whether the bridge network 20 is in a balanced condition.

As illustrated more or less diagrammatically in Fig. 1A, the bridge network 20 may be restored to its effective balanced condition, upon unbalance thereof as a result of deflection of the galvanometer pointer 7, by adjustment of the point 29a along the the resistors 21 and 22 in lieu of effecting rebalance by restoration of the pointer 7 to a predetermined position in which the bridge network is balanced as in Fig. 1. When it is desired to rebalance the bridge network in this manner, a single resistor of appropriate value may be employed in lieu of separate resistors 21 and 22 and a contact in sliding engagement with said resistor may desirably be provided. The adjustment of said sliding contact may readily be effected by the motor 12 in the same manner as described for effecting the adjustment of the contact 10 along the potentiometer slidewire resistors 9. In this modified arrangement, however, the contact 10 is desirably adjusted manually as, for example, by a knob 10a and the pen 40 and chart 41, together with the driving means for the latter, may be associated with said sliding contact for recording the successive positions of the contact and thereby the temperature changes in the furnace 1.

In Figs. 3–5 I have illustrated, more or less diagrammatically, alternative embodiments of my invention in which the effect of the non-uniform voltage gradient existing between the anodes 15 and 16 is neutralized, and hence any well known form of amplifier capable of amplifying both half cycles of an alternating voltage may be employed for selectively controlling the rotation of motor 12 in response to unbalance of bridge network 20. For example, the arrangement illustrated in the Anschutz-Kaempfe Patent 1,586,233, issued May 25, 1926, may be employed. It will be clear, however, that the amplifier 11 illustrated in Fig. 1 may be employed, if desired.

In the modified arrangement shown in Fig. 3, the fixed resistors 21 and 22 of the Fig. 1 arrangement have been replaced by a pair of anodes 44 and 45 which are desirably placed in the envelope 14 of electric discharge valve 13. The bridge network formed by the anodes 15, 16, 44 and 45 has for convenience been designated by the reference numeral 20a, and as shown is energized by the alternating voltage supply conductors $L^1$ and $L^2$. As will be clearly apparent, when the anodes 44 and 45 are of the same shape as the anodes 15 and 16 and positioned the same distance apart in the same container, the potential of a point intermediate the anodes 44 and 45 will always be the same as the potential of a point intermediate the anodes 15 and 16. The absolute values of the potentials of these points will not necessarily remain constant but the relative values of the potentials will.

As illustrated, an electrode 46, preferably of the same shape as the end of galvanometer pointer 7, is positioned intermediate the anodes 44 and 45 and is rigidly secured in any convenient manner in that position. The point of engagement of the electrode 46 with the discharge current passing between the anodes 44 and 45 comprises one balancing junction of the bridge network 20a and the other balancing junction thereof is the point of engagement of the end of galvanometer pointer 7 with the discharge current passing between the anodes 15 and 16. When the galvanometer 6 is undeflected, the end of pointer 7 will be intermediate the anodes 15 and 16, and the bridge network 20a will then be in a precisely balanced condition, that is to say, no current will then flow through the balancing conductors 23 and 27. The balancing conductors 23 and 27 are connected to the input circuit of an amplifier of the type described hereinbefore, for example, to the input terminals of the amplifier disclosed in the Anschutz-Kaempfe patent or to the input terminals of the amplifier 11 of Fig. 1. In either case, when the flow of current through the balancing conductors 23 and 27 is zero, the motor 12 selectively controlled for rotation by the amplifier will not be energized for rotation in either direction, but will remain stationary.

Upon deflection of galvanometer pointer 7 in one direction or the other from its normal position intermediate the anodes 15 and 16, however, an alternating voltage in phase with or 180° out of phase with the line voltage will be impressed on the amplifier input terminals and the motor 12 will be energized for rotation in a corresponding direction.

In the modification illustrated in Fig. 4, the anodes 15, 16, 44, and 45 of the arrangement disclosed in Fig. 3 have been dispensed with and a single pair of anodes 47 and 48, desirably positioned face to face in the envelope 14 of electric discharge valve 13 and connected across the alternating voltage supply conductors $L^1$ and $L^2$, are employed in lieu thereof. The fixed electrode 46 is adapted to engage the discharge current passing between the anodes 47 and 48 at a point intermediate the anodes, and when the galvanometer 6 is in its undeflected position, the pointer 7 engages the discharge current at a point intermediate the anodes which is at the same potential as the electrode 46 so that no current will then flow in the balancing junctions 23 and 27. It will be readily apparent, however, that on deflection of the pointer 7 from its normal position intermediate the anodes 47 and 48 an alternating voltage in phase with or 180° out of phase with the line voltage will be impressed on the conductors 23 and 27 and may be employed as previously described for controlling the rotation and direction of rotation of the motor 12.

In Fig. 5 a modification of the Fig. 4 arrangement has been illustrated in which the points of engagement of the electrode 46 and galvanometer pointer 7 with the discharge current passing between the anodes 47 and 48 are closely adjacent each other. As illustrated, the electrode 46 and galvanometer pointer 7 extend between the anodes 47 and 48, and insulating coverings 49 and 50 placed on the electrode 46 and pointer 7, respectively, shield all of these elements, except short adjacent lengths, from the electron stream passing between the anodes 47 and 48.

It will be apparent the motor 12 may be employed to operate a control valve or rheostat for governing the application of an agent to a furnace for producing heat for example to which the thermocouple 2 is responsive or another motor desirably operated together with motor 12 may be so employed. For example, as shown in Fig. 6, a furnace 1, to the temperature of which thermocouple 2 is responsive, is heated by a resistor 51 which is connected to electrical supply conductors $L^3$ and $L^4$ through a rheostat 52, the adjustment of which is effected by a motor 53. The motor 53 may be exactly like motor 12 and is shown connected in parallel therewith. The mechanical connection of the rheostat 52 to the motor 53 is such as to decrease and increase the supply of electric current to resistor 51 as the temperature of furnace 1 rises above or falls below a predetermined level.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims and that certain features of my invention may sometimes be used to advantage without a corresponding use of other features.

Having now described my invention, what I claim as new and desire to secure by Letters Patent is:

1. Measuring apparatus including a normally balanced primary network and an element cooperating with said network for determining a point of balance therefor, a member movable to a position corresponding to the point of balance, means responsive to the establishment of balance, said responsive means including a galvanometer having its moving coil mounted in an electrical discharge valve, an electrical bridge network at least one arm of which includes the space path resistance between a pair of electrodes contained in said discharge valve, means comprising one balancing junction of said bridge network and carried by said galvanometer coil adapted to vary the amount of space path resistance included in said bridge network arm, means responsive to unbalance of said bridge network, and a motor controlled by said last mentioned means to operate said member.

2. Measuring apparatus including in combination with a balanced electrical network, an element responsive to changes in a variable condition adapted to produce unbalanced electromotive forces in said network, a device adapted to reduce said unbalance electromotive forces, and means responsive to said unbalance electromotive forces adapted to control the actuation of said device in accordance with the magnitude of said condition, said last mentioned means including a galvanometer having its moving coil mounted in an electrical discharge valve, an electrical bridge network at least one arm of which includes the space path resistance between a pair of electrodes contained in said discharge valve, means comprising a balancing junction of said bridge network and carried by said galvanometer coil adapted to vary the amount of space path resistance included in said bridge network, and means responsive to unbalance of said bridge network to control said device.

3. Measuring apparatus including an electrical bridge network adapted to be unbalanced upon a change in magnitude of a variable condition, at least one arm of said bridge network including the space path resistance between a pair of electrodes contained in an electrical discharge valve, a galvanometer having its moving coil mounted in said discharge valve, means comprising one balancing junction of said network and carried by said galvanometer coil adapted to vary the amount of space path resistance included in said bridge network arm responsively to deviation of said galvanometer coil from a predetermined position, and means responsive to unbalance of said bridge network to restore said galvanometer coil to said predetermined position.

4. Measuring apparatus including electron discharge means, a movable element arranged in the discharge path of said means to establish a potential corresponding to its position therein and carried by the moving coil of a galvanometer, means associated with but separate from said discharge means and establishing a point of fixed potential, means for impressing a voltage to be measured on said galvanometer coil, means for reducing said voltage, and means connected to said movable element and to said fixed point of potential and responsive to the potential difference therebetween to control said last mentioned means in accordance with the potential difference.

5. Measuring apparatus including a normally balance primary network and an element cooperating with said network for determining a point of balance therefor, a member movable to a position corresponding to the point of balance, means responsive to the establishment of balance, said responsive means including a galvanometer having its moving coil mounted in an electrical discharge valve, an electrical bridge network the arms of which include the space path resistance between two pairs of electrodes contained in said discharge tube, a fixed element comprising one balancing junction of said bridge network and positioned between one pair of said electrodes, an element comprising the other balancing junction of said bridge network positioned between the other pair of said electrodes and carried by said galvanometer coil, means responsive to unbalance of said bridge network, and a motor controlled by said last mentioned means to operate said member.

6. Measuring apparatus including in combination with a balanced electrical network, an element responsive to changes in a variable condition adapted to produce unbalanced electromotive forces in said network, a device adapted to reduce said unbalanced electromotive forces, and means responsive to said unbalanced electromotive forces adapted to control the actuation of said device in accordance with the magnitude of said condition, said last mentioned means including a galvanometer having its moving coil mounted in an electrical discharge valve, an electrical bridge network the arms of which include the space path resistance between two pairs of electrodes contained in said discharge tube, a fixed element comprising one balancing junction of said bridge network and positioned between one pair of said electrodes, an element comprising the other balancing junction of said bridge network positioned between the other pair of said electrodes and carried by said galvanometer coil, and means responsive to unbalance of said bridge network to control said device.

7. Measuring apparatus including an electrical bridge network adapted to be unbalanced upon a change in magnitude of a variable condition, the arms of said bridge network including the space path resistance between two pairs of electrodes contained in an electrical discharge valve, a fixed element positioned between one pair of said electrodes and in engagement with the electrical particles traversing the space between said electrodes, a movable element positioned between the other pair of electrodes and in engagement with the electrical particles traversing the space between those electrodes, the said elements comprising the balancing junctions of said network, means including a galvanometer moving coil mounted in said discharge tube adapted to carry said movable element, and means responsive to unbalance of said bridge network to control said galvanometer coil to reduce said unbalance.

8. Measuring apparatus including a plurality of electron discharge means, a fixed element arranged in the discharge path of one of said means to establish a point of reference potential, a galvanometer having a movable coil, a movable element arranged in the discharge path of another of said means to establish a potential corresponding to its position therein and carried by the movable coil of said galvanometer, means for impressing a voltage to be measured on said galvanometer coil, means for reducing said voltage, and means connected to said elements and responsive to the potential difference therebetween to control said last mentioned means in accordance with the potential difference.

9. Measuring apparatus including electron discharge means, a fixed element arranged in the discharge path of said means to establish a point of reference potential, a galvanometer having a movable coil, a movable element arranged in the discharge path of said means to establish a potential corresponding to its position therein and carried by the movable coil of said galvanometer, means for impressing a voltage to be measured on said movable coil, means for reducing said voltage, and means connected to said elements and responsive to the potential difference therebetween to control said last mentioned means in accordance with the potential difference.

10. Measuring apparatus including an envelope, electron discharge means mounted within said envelope, a fixed element arranged in the discharge path of said means to establish a point of reference potential, a galvanometer having a movable coil mounted in said envelope, a movable element arranged in the discharge path of said means to establish a potential corresponding to its position therein and carried by the movable coil of said galvanometer, means for impressing a voltage to be measured on said movable coil, means for reducing said voltage, and means connected to said elements and responsive to the potential difference therebetween to control said last mentioned means in accordance with the potential difference.

11. Measuring apparatus including electron discharge means, a reference potential point fixed in relation to the potential drop along the discharge path of said means, a galvanometer having a movable coil, a movable element arranged in the discharge path of said means to establish a potential corresponding to its position therein and carried by the movable coil of said galvanometer, means for impressing a voltage to be measured on said movable coil, means to indicate the magnitude of said voltage, and means connected to said reference potential point and to said movable element and responsive to the potential difference therebetween to control said indicating means in accordance with the potential difference.

12. Measuring apparatus including electron discharge means having a point of reference potential, a galvanometer having a movable coil, a movable element arranged in the discharge path of said means and carried by the movable coil of said galvanometer, means for impressing a voltage to be measured on said movable coil, means to indicate the magnitude of said voltage, and means connected to the point of reference potential of said electron discharge means and to said movable element and responsive to differences in potential therebetween to control said indicating means in accordance with the potential difference.

13. Measuring apparatus including a normally balanced primary network and an element cooperating with said network for determining a point of balance therefor, a member movable to a position corresponding to a point of balance, means responsive to the establishment of balance, said responsive means including a galvanometer having its moving coil mounted in an electrical discharge valve, an electrical bridge network the arms of which include the space path resistance between a pair of electrodes contained in said discharge tube, a fixed element comprising one balancing junction of said bridge network and positioned between said electrodes, an element comprising the other balancing junction of said bridge network positioned between said electrodes and carried by said galvanometer coil, means responsive to unbalance of said bridge network, and a motor controlled by said last mentioned means to operate said member.

14. Measuring apparatus including in combination with a balanced electrical network, an element responsive to changes in a variable condition adapted to produce unbalanced electromotive forces in said network, a device adapted to reduce said unbalanced electromotive forces, and means responsive to said unbalanced electromotive forces adapted to control the actuation of said device in accordance with the magnitude of said condition, said last mentioned means including a galvanometer having its moving coil mounted in an electrical discharge valve, an electrical bridge network the arms of which include the space path resistance between a pair of electrodes contained in said discharge tube, a fixed element comprising one balancing junction of said bridge network and positioned between said electrodes, an element comprising the other balancing junction of said bridge network positioned between said electrodes and carried by said galvanometer coil, and means responsive to unbalance of said bridge network to control said device.

15. Measuring apparatus including an electrical bridge network adapted to be unbalanced upon a change in magnitude of a variable condition, the arms of said bridge network including the space path resistance between a pair of electrodes contained in an electrical discharge valve, a fixed element positioned between said electrodes and in engagement with the electrical particles traversing the space between said electrodes, a movable element positioned between said electrodes and in engagement with the electrical particles traversing the space between said electrodes, means carrying said movable element including a galvanometer moving coil mounted in said discharge tube, and means responsive to unbalance of said bridge network to control said galvanometer moving coil to reduce said unbalance.

16. Measuring apparatus comprising a bridge network, energizing means therefor, a pair of electrodes included in said bridge network and subjected to different potentials, the space between said electrodes forming a resistance portion of said bridge network, means for producing an electrical quantity variable in accordance with the variations in a measurable condition, a third electrode controlled in position by the variations in said electrical quantity and disposed adjacent the first mentioned electrodes so that said third electrode is subjected to a potential intermediate the first mentioned potentials and of a value related to said first mentioned potentials in accordance with the value of said condition, a second electrical quantity opposing said first mentioned electrical quantity, and a device connected to said third electrode to measure the unbalance in said bridge circuit, said device including an electronic amplifier and a reversible electrical motor controlling said second electrical quantity to continuously make said second electrical quantity equal to said first electrical quantity, and means deflected in accordance with the rotation of said motor to measure said condition.

17. Measuring apparatus comprising a bridge network, energizing means therefor, a pair of electrodes included in said bridge network and subjected to different potentials, the space between said electrodes forming a resistance portion of said bridge network, a third electrode controlled in position by variations in a measurable condition and disposed adjacent the first mentioned electrodes so that said third electrode is subjected to a potential intermediate the first mentioned potentials and of a value related to said first mentioned potentials in accordance with the value of said condition, a second pair of electrodes subjected to different potentials and the space therebetween forming a resistance portion of the bridge network, a sixth electrode disposed adjacent the second pair of electrodes whereby said sixth electrode is subjected to a potential intermediate the potentials of said second pair of electrodes, and a device connected to said third and sixth electrodes to measure the unbalance in said bridge circuit.

EARL A. KEELER.